United States Patent Office.

HENRY ADOLPH, OF CLINTON, KANSAS.

Letters Patent No. 90,715, dated June 1, 1869.

---

IMPROVED MEDICAL COMPOUND.

---

The Schedule referred to in these Letters Patent and making part of the same.

---

*To all whom it may concern:*

Be it known that I, HENRY ADOLPH, of Clinton, in the county of Douglas, and State of Kansas, have invented a new and improved Medical Compound; and I do hereby declare that the following is a full, clear, and exact description thereof, which will enable others skilled in the art to make and use the same.

This invention relates to a new and useful composition, to be used as a liniment for external diseases on sheep, horses, and cattle; also, valuable as a remedy for leprosy, and other diseases to which the human body is subject, and consists in a compound formed of the ingredients hereinafter named.

It is quite unnecessary to enlarge upon the fatal diseases to which sheep are subject, as the "rot" and the "scab," nor to many forms of skin-diseases to which horses and cattle are subject, which have baffled the skill of professed veterinary surgeons. Suffice it to say that my compound has been proved a specific for almost every form of cutaneous disease in sheep and other animals.

In carrying out my invention, I make use of the following ingredients, in about the proportions named:

To three gallons of urine, of man or beast, I add sixteen pounds of Brazilian or other good tobacco, and four pounds of common salt.

The mode of preparation is to mix the ingredients in a tub, and allow the mixture to stand about four weeks, when it is ready for use.

Having thus described my invention,

What I claim as new, and desire to secure by Letters Patent, is—

The compound formed of the ingredients (in about the proportions) herein named, substantially as and for the purposes set forth.

The above specification of my invention signed by me, this 11th day of March, 1869.

HENRY ADOLPH.

Witnesses:
JESSE McKENNEY,
JNO. W. BULLOCK.